United States Patent
Schmutz

Patent Number: 6,104,452
Date of Patent: Aug. 15, 2000

[54] OPTICAL ILLUMINATOR FOR LIQUID CRYSTAL DISPLAYS

[75] Inventor: Lawrence E. Schmutz, Watertown, Mass.

[73] Assignee: Adaptive Optics Associates, Inc., Cambridge, Mass.

[21] Appl. No.: 08/861,409

[22] Filed: May 21, 1997

Related U.S. Application Data

[63] Continuation-in-part of application No. 08/269,725, Jul. 1, 1994, Pat. No. 5,682,213.

[51] Int. Cl.[7] ............................. G02F 1/1335; G02B 6/00
[52] U.S. Cl. ................................ 349/61; 349/71; 349/62; 349/95
[58] Field of Search ................................ 349/57, 61, 62, 349/71, 95, 106; 359/619, 15, 621, 34, 622, 623; 362/26, 27, 32; 385/16, 17, 88, 89, 115, 116, 119, 901

[56] References Cited

U.S. PATENT DOCUMENTS

| | | | |
|---|---|---|---|
| 3,700,802 | 10/1972 | Markin et al. | 348/790 |
| 4,237,332 | 12/1980 | Winston | 136/259 |
| 4,798,448 | 1/1989 | van Raalte | 350/345 |
| 4,818,049 | 4/1989 | Assenheim et al. | 350/96.15 |
| 4,977,487 | 12/1990 | Okano | 362/32 |
| 4,997,263 | 3/1991 | Cohen et al. | 350/345 |
| 5,005,108 | 4/1991 | Pristash et al. | 362/31 |
| 5,012,274 | 4/1991 | Dolgoff | 340/702 |
| 5,016,956 | 5/1991 | Gasparaitis et al. | 350/96.1 |
| 5,040,878 | 8/1991 | Eichenlaub | 350/345 |
| 5,101,325 | 3/1992 | Davenport et al. | 362/31 |
| 5,130,794 | 7/1992 | Ritchey | 358/87 |
| 5,136,480 | 8/1992 | Pristash et al. | 362/31 |
| 5,222,795 | 6/1993 | Hed | 362/32 |
| 5,270,859 | 12/1993 | Wirth et al. | 359/622 |
| 5,300,942 | 4/1994 | Dolgoff | 345/32 |
| 5,315,418 | 5/1994 | Sprague et al. | 359/41 |
| 5,377,027 | 12/1994 | Jelley et al. | 359/48 |
| 5,384,882 | 1/1995 | Shimanue et al. | 385/116 |
| 5,432,876 | 7/1995 | Appeldorn et al. | 385/31 |
| 5,440,411 | 8/1995 | Fujiware et al. | 359/42 |
| 5,440,654 | 8/1995 | Lambert, Jr. | 385/17 |
| 5,506,701 | 4/1996 | Ichikawa | 359/15 |

FOREIGN PATENT DOCUMENTS

| | | |
|---|---|---|
| 3301914 | 7/1984 | Germany. |
| 406160853 | 6/1994 | Japan. |

*Primary Examiner*—William L. Sikes
*Assistant Examiner*—Tai V. Duong

[57] ABSTRACT

The present invention teaches a liquid crystal display system comprising a liquid crystal display ("LCD") having a plurality of pixels. Moreover, the system comprises an illuminator for illuminating each of said plurality of pixels. The illuminator comprises an optical fiber for transmitting a light beam within said fiber, and a number of discrete scattering sites positioned along the fiber for scattering a portion of the light beam outside said fiber. The number of discrete scattering sites are optically coupled with the plurality of pixels such that the plurality of pixels are illuminated by the light beam scattered outside the fiber through the number of discrete scattering sites.

16 Claims, 5 Drawing Sheets

INCREMENTAL SOURCE AREA A

SOLID ANGLE OF RADIATION Ω

OPTICAL ILLUMINATOR FOR LIQUID CRYSTAL DISPLAYS

The subject matter claimed herein is a continuation-in-part under 35 USC 120 of application Ser. No. 08/269,725, filed Jul. 1, 1994, now U.S. Pat. No. 5,682,213.

TECHNICAL FIELD

This invention relates to the field of optical devices, a more particularly, an optical illuminator for use in liquid crystal displays.

BACKGROUND ART

Until recently, the cathode ray tube ("CRT") has been the primary device for displaying information. While having sufficient display characteristics with respect to color, brightness, contrast and resolution, CRTs are relatively bulky and power inefficient. With the advent of portable laptop computers, demand has intensified for a power efficient display having a lightweight and compact design.

Liquid crystal display ("LCD") systems are one such display technology. LCDs comprise a plurality of pixels arranged in a matrix. Each pixel of the matrix comprises a light valve for allowing light to pass through the display in response to a control signal. This light is generated by a backlight illuminator.

A variety of backlight illuminator designs are known in the art. Some of these designs are described in U.S. Pat. No. 5,101,325, incorporated herein by reference. However, these known designs require a large amount of energy to operate, have limited performance characteristics, and are complex to manufacture.

Presently, alternate designs for LCD backlight illuminators predominantly attempt to provide a uniform, nearly Lambertian light source modulated spatially by color and intensity. This has been realized through the use of an LCD light valve for producing a dynamic color image.

The active area of an LCD comprises less than 25% of the device's overall area, and as a result, 75% of the light emitted by the illuminator illuminates inactive areas of the LCD. Attempts to improve the utilization of the illuminator light have frequently centered on the arrangement of lens structures between the illuminator and the LCD for the purpose of directing the illuminator light only onto the LCD's active area. Such approaches, however, have several shortcomings particularly in view of the fundamental properties of Lambertian light sources. The inherent limitation of illumination from any source may be best understood by the following mathematical construct called the étendue, U, defined by:

$$dU = dp_x \cdot dpy \cdot dx \cdot dy$$

where $p_x$ and $p_y$ are the optical direction cosines of rays in a beam of radiation, referring to rectangular coordinate axes x, y, and z. In any passive optical system, the etendue must be conserved due to thermodynamic constraints. This principle is represented by the following mathematical formula:

$$S \cdot dU = \text{constant}$$

where S is a characteristic dependent on the specific optical system employed.

By way of these hereinabove mathematical expressions, there are inherent limitations as to the extent to which an optical beam may be concentrated. This realization was proved by Dr. Roland Winston in his published paper in the Journal of the Optical Society of America, volume 60, pages 245–247 (1970), herein incorporated by reference.

The limiting aspect of the concentration of optical beams may be better followed by referring to the imaging optical systems shown in FIGS. 1a and 1b. Given this arrangement, the product of the area A and the solid angle $\Omega$ of radiation. Given this arrangement, the product of the area A and the solid angle $\Omega$ results in a constant:

$$A \cdot \Omega = \text{constant}$$

Further, in FIG. 1b, a Lambertain source is shown coupled with an active site of an LCD. Here, the Lambertain source comprises a dimension h, with h' representing the relevant dimension of the active site of the LCD. Employing these variable, the following mathematical relationship exists between the angle θ emerging from the source and the angle θ' exiting from the LCD active site:

$$h \cdot \theta = h' \cdot \theta'.$$

Thus, for example, when h'=(½)·h, the angle θ' exiting from the LCD is double the angle θ emerging from the source. In Lambertian sources, however, the angle θ emerging from the source is nearly 180°, such that the angle θ' exiting from the LCD should be approximately 360°. However, this cannot be physically realized. Therefore, it naturally follows that some illumination must escape within the defined optical system. As such, improving the coupling of a continuous Lamberian source by means is practically unobtainable. Conversely, all Lambertian sources have unavoidable inefficiencies when coupled with an LCD having a limited active area.

Given these limitations, there exists a demand for an LCD backlight illuminator requiring less energy for operation, improved performance characteristics, and are easier to manufacture.

DISCLOSURE OF THE INVENTION

The primary advantage of the present invention is to provide a backlight illuminator for LCDs requiring less energy to operate.

A further advantage of the present invention is to provide a backlight illuminator for LCDs having improved performance characteristics.

Another advantage of the present invention is to provide a backlight illuminator for LCDs that is easier to manufacture.

Still another advantage of the present invention is to provide a backlight illuminator for LCDs having a substantially smaller effective source region size than the LCD's active sites.

Still a further advantage of the present invention is to provide a backlight illuminator for LCDs having a substantially higher illumination efficiency than previously known.

Yet still another advantage of the present invention is to provide a backlight illuminator for LCDs enabling the use of optical arrangements in conjunction with the output of the LCD in light of the substantially smaller effected source size.

Further still, another advantage of the present invention is to provide a backlight illuminator for LCDs enabling the separation of the light generation source from the illumination region.

In order to achieve the advantages of the present invention, a liquid crystal display system is disclosed comprising a liquid crystal display ("LCD") having a plurality of pixels. Moreover, the system comprises an illuminator for illuminating each of said plurality of pixels. The illuminator comprises an optical fiber for transmitting a light beam within said fiber, and a number of discrete scattering sites positioned along the fiber for scattering a portion of the light beam outside said fiber. The number of discrete scattering sites are optically coupled with the plurality of pixels such that the plurality of pixels are illuminated by the light beam scattered outside the fiber through the number of discrete scattering sites.

In a further embodiment of the present invention, a chromatic liquid crystal display system is disclosed comprising a liquid crystal display ("LCD") having a plurality of pixel sets and a colorized illuminator for colorizing each of said plurality of pixel sets. Here, the colorized illuminator comprises an optical fiber for transmitting a light beam within the fiber, wherein the fiber has a number of discrete scattering sites positioned along the fiber for scattering a portion of the light beam outside the fiber. The colorized illuminator further comprises a color filter for colorizing the portion of the light beam scattered outside the fiber, and a lens arrangement for optically coupling the number of discrete scattering sites with the plurality of pixel sets.

BRIEF DESCRIPTION OF THE DRAWINGS

The present invention will be better understood from reading the following description of non-limited embodiments, with reference to the attached drawings, wherein below.

DETAILED DESCRIPTION OF THE INVENTION

In U.S. Pat. No. 5,222,795, incorporated herein by reference, a general device is disclosed for illuminating an area of an optical waveguide. Here, inventor Aharon Z. Hed teaches the use of a continuous strip of material along an optical fiber for illumination by scattering an internal light beam input. This reference, however, neither discloses nor suggests employing the device as a LCD backlight illuminator.

Figure 2A:
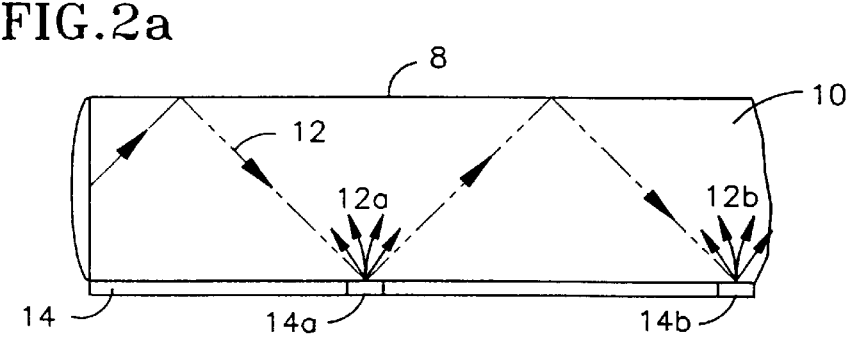
FIGS. 2a and 2b illustrate a planar and a cross-sectional perspective of a phenomenon of employing discrete scattering sites on a fiber transmitting light energy.
Figure 2B:
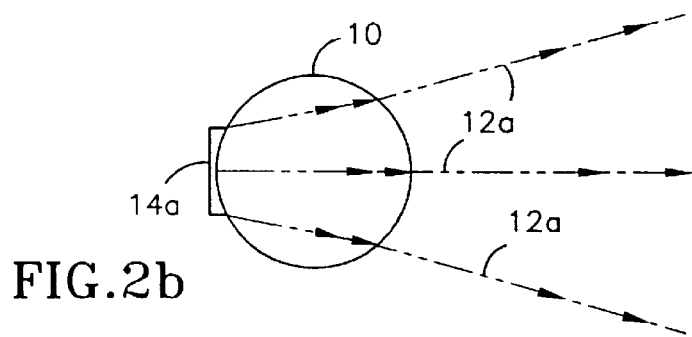

Referring to FIGS. 2a and 2b, a plurality of discrete scattering sites 14a and 14b are depicted on an optic fiber 10 to create an optical illuminator 8. Optic fiber 10 comprises an input light beam 12, and is sufficiently doped to contain the input light beam 12 within the fiber. In the preferred embodiment of the present invention, fiber 10 comprises a diameter substantially in the range of 20 $\mu$m.

Figure 1A:
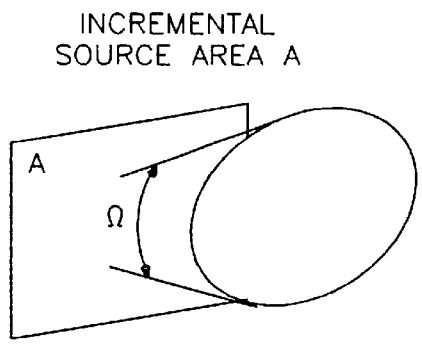
FIGS. 1a and 1b illustrate a first and second imaging optical system, respectively.
Figure 1B:
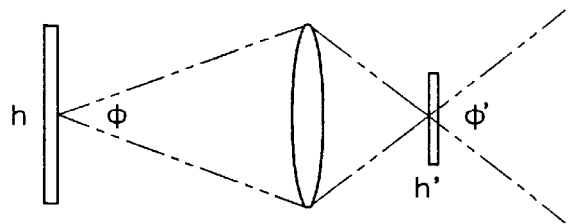

Fiber 10 further comprises a plurality of scattering sites 14a and 14b that can be formed by many techniques known to one of ordinary skill in that art using a known scattering material(s). Sites 14a and 14b are positioned along the outside surface of fiber 10. By so doing, a plurality of scattered light beams 12a and 12b are realized for scattering a portion of input light beam 12 outside fiber 10, as best shown in FIG. 1b. These scattered light beams 12a and 12b form the basis for optical illuminator 8.

Each scattering site along the fiber 10 must comprise wider dimensions than the previous site. This aspect of the invention is necessitated by the fact that a portion of the input light beam 12 is lost at each subsequent scattering site. As such, subsequently larger scattering sites are employed to compensate for this energy loss. Alternatively, the electrical signals to the LCD may be adjusted to compensate for the variations in illumination.

Figure 3A:
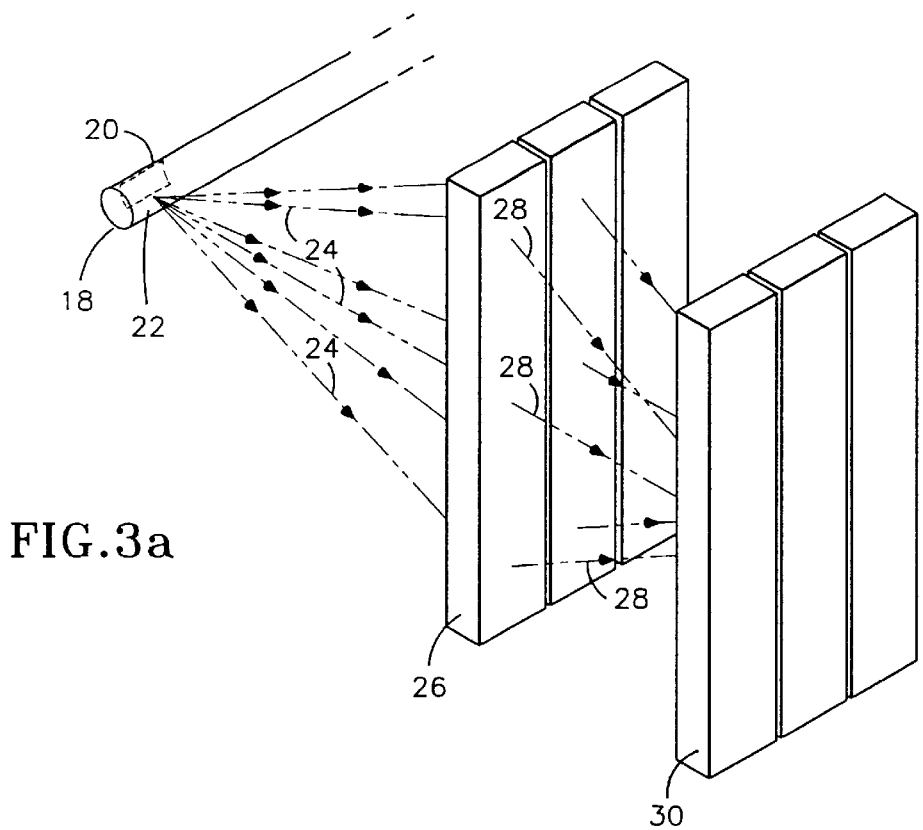
FIGS. 3a and 3b illustrate a cross-sectional and a three dimensional perspective, respectively, of a first embodiment of the present invention.

Referring to FIG. 3a, a cross-sectional perspective of a first perspective of a first embodiment, a liquid crystal display system, is illustrated. Here, an optical fiber 20 is shown comprising a plurality of discrete scattering sites 22 to form an optical illuminator 18. Each discrete scattering site 22 of the plurality scatters a portion of an input light beam outside the fiber 20 in the direction of a plurality of optical lens arrangements 26. This scattered light beam 24 is directed at the plurality of optical lens arrangements 26 for the purpose of illuminating a plurality of pixel elements in liquid crystal display ("LCD") 30. Thus, a light beam 28 emanating from arrangement 26 illuminates LCD 30.

Optical lens arrangement 26 optically couples each discrete scattering site with an associated cluster of pixels 32. This can be realized by several means known in art, including a micro optic multiplet ("MOM") lenslet, also referred to as an integrated monolithic lenslet module, as described in U.S. Pat. No. 5,270,859, commonly assigned with the present invention, and hereby incorporated by reference. In one embodiment of the present invention, lens arrangement 26 is formed on a substrate.

Figure 3B:
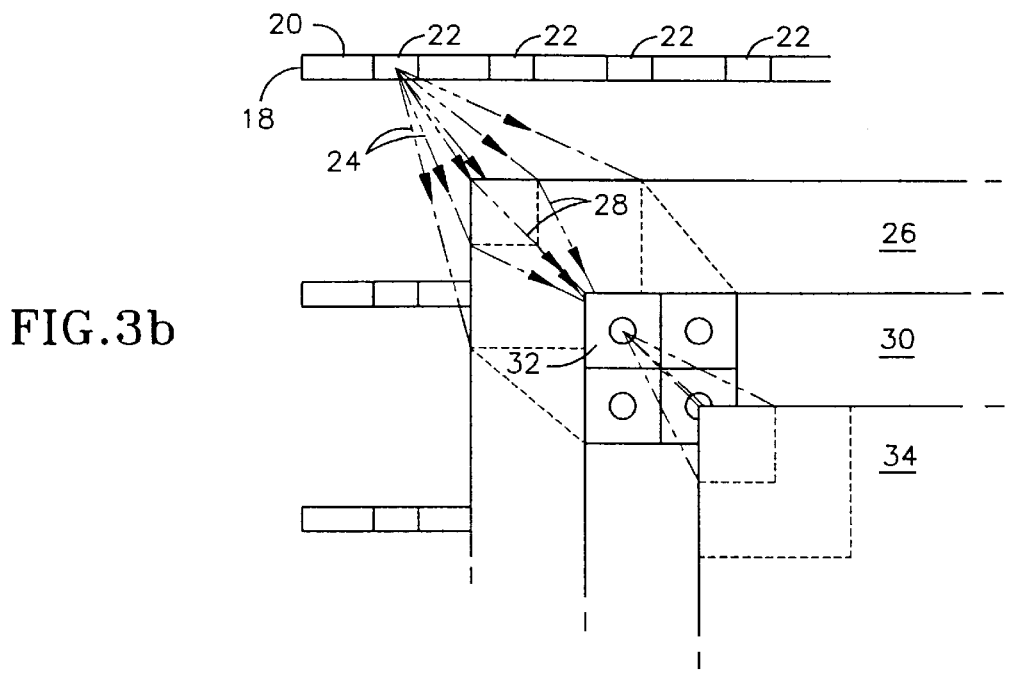

Referring to FIG. 3b, a three-dimensional illustration of the first embodiment of the present invention is illustrated. From this perspective, illuminator 18 is shown to further comprise an additional lens arrangement 34 for enhancing the image output of LCD 30 diminished due to the spacing between each pixel. It should be apparent to one of ordinary skill in the art from this view that several discrete scattering sites of the plurality of sites may be employed to illuminate a single pixel 32 of LCD 30, or that a single discrete scattering site may illuminate many pixels. In the preferred embodiment, a single discrete site is used to illuminate a plurality of pixels.

Figure 4:
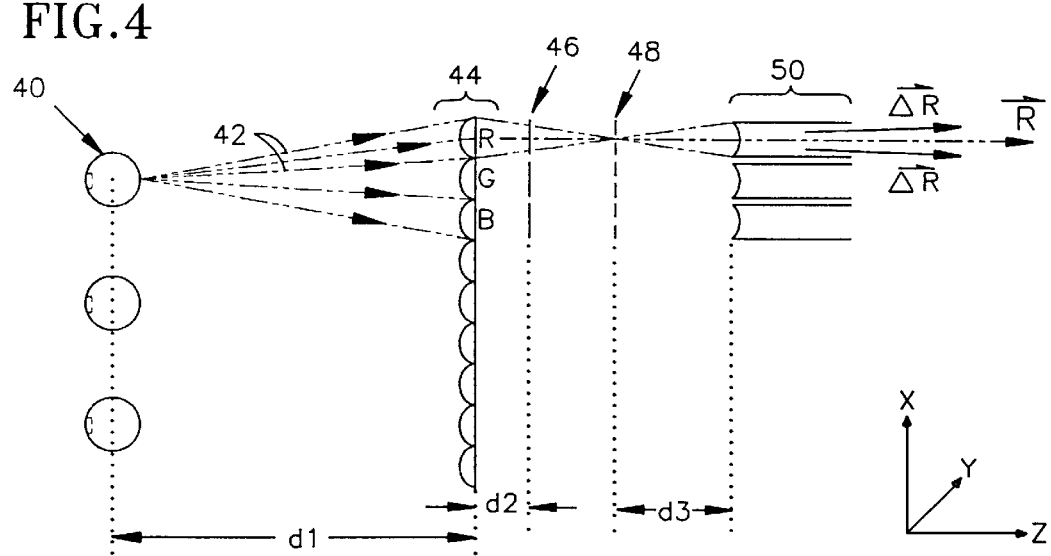
FIG. 4 illustrates a cross-sectional perspective of a second embodiment of the present invention.

Referring to FIG. 4, a cross-sectional perspective of a second embodiment, a chromatic liquid crystal display system, is depicted. The chromatic liquid crystal display system comprises an optical illuminator 40. By means of a plurality of discrete scattering sites, optical illuminator 40 generates a scattered light beam 42 in the direction of a first lens arrangement 44. First lens arrangement 44 is spaced from illuminator 40 by a distance $d_1$. Functionally, first lens arrangement couples illuminator 40 with LCD display 48 and may be realized by a MOM lenslet.

To provide a chromatic image, a color filter 46 is incorporated in the system. Color filter 46 is separated from first lens arrangement 44 by a distance $d_2$. In one embodiment of the present invention, color filter 46 comprises a red, green, and blue filter for converting scattered light beam 42 into a red light beam, a green light beam and a blue light beam. By this arrangement, each of these red, green and blue light beams are directed at an associated set of color pixels—red, green and blue—in LCD display 48. Each illuminator 40 can illuminate multiple groups of red, green and blue pixels. One possible distribution of these groups is along the 'Y' axis defined in FIG. 4, consistent with FIG. 3a. Other groups are possible, and this invention is not limited to the groupings shown in FIG. 3a and 4.

In a further embodiment of the present invention, the chromatic liquid crystal display system also comprises an additional lens arrangement 50 for recombining the red, green and blue emissions of a set of color pixels into a resultant color. LCD display 48 is spaced from lens arrangement 50 by a distance $d_3$. Additional lens arrangement 50 may be realized by a MOM lenslet. Similarly, in still another embodiment, at least one of lens arrangements 48 and 50 are formed on a substrate.

Figure 5:
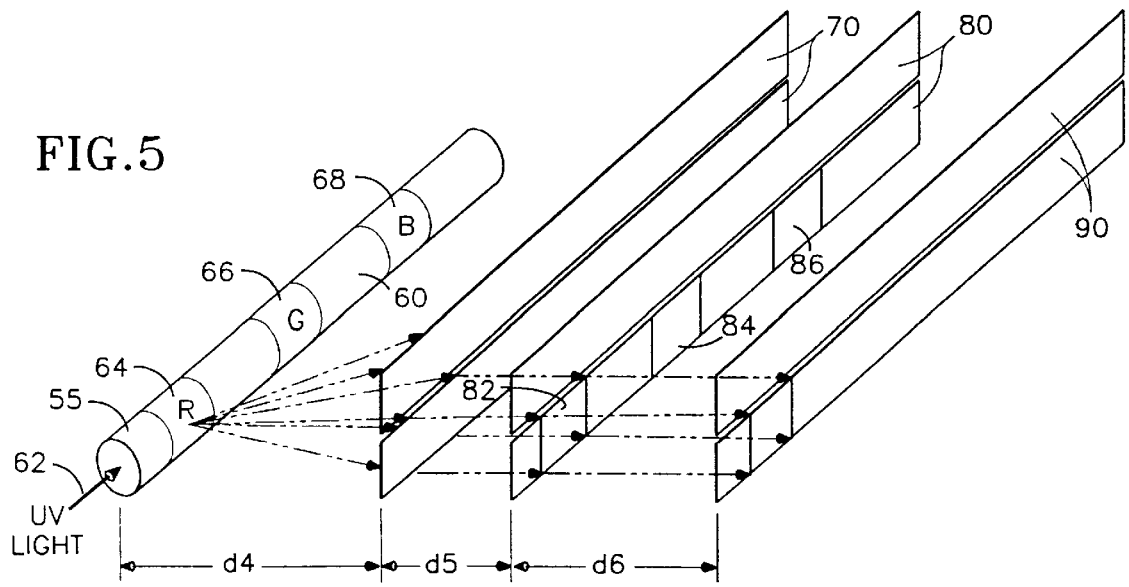
FIG. 5 illustrates a three-dimensional perspective of a third embodiment of the present invention.

Referring to FIG. 5, a three dimensional perspective of a third embodiment, a chromatic liquid crystal display system, is illustrated. Here, optical illuminator 55 comprises an optical fiber 60 having a number of discrete scattering site groupings. Each discrete scattering site grouping comprises a red, green and blue scattering site, 64, 66 and 68, respectively. Unlike the previous embodiments, red, green and blue scattering site, 64, 66 and 68 comprise a fluorescent composition such that upon transmitting light beam 62 into optical fiber 60, discrete scattering sites, 64, 66 and 68, illuminate their respective colors. In this embodiment, light beam 62 preferably comprises ultra violet light.

Further, this chromatic liquid crystal display system comprises a lens arrangement 70 for optically coupling each grouping of scattering sites with a plurality of sets of pixels in a liquid crystal display 80. Illuminator 60 and lens arrangement 70 are separated by a distance $d_4$, while arrangement 70 is spaced from liquid crystal display 80 by distance $d_5$. Lens arrangement 70 may be realized by a MOM lenslet.

Each of the colorzied light beams of a discrete scattering site grouping generated by optical fiber 60 and transmitted by lens arrangement 70 are directed at a plurality of sets of pixels of LCD 80. The set of pixels, 82, 84 and 86, correspond with their respective red, green and blue scattering sites to provide a chromatic LCD system.

In a further embodiment, the chromatic liquid crystal display system also comprises an additional lens arrangement 90 for recombining the red, green and blue emissions of a set of color pixels into a resultant color. LCD display 80 is spaced from additional lens arrangement 90 by a distance d6. Additional lens arrangement 50 may also be realized by a MOM lenslet. Further, at least one of lens arrangements 48 and 50 may be formed on a substrate.

Figure 6:
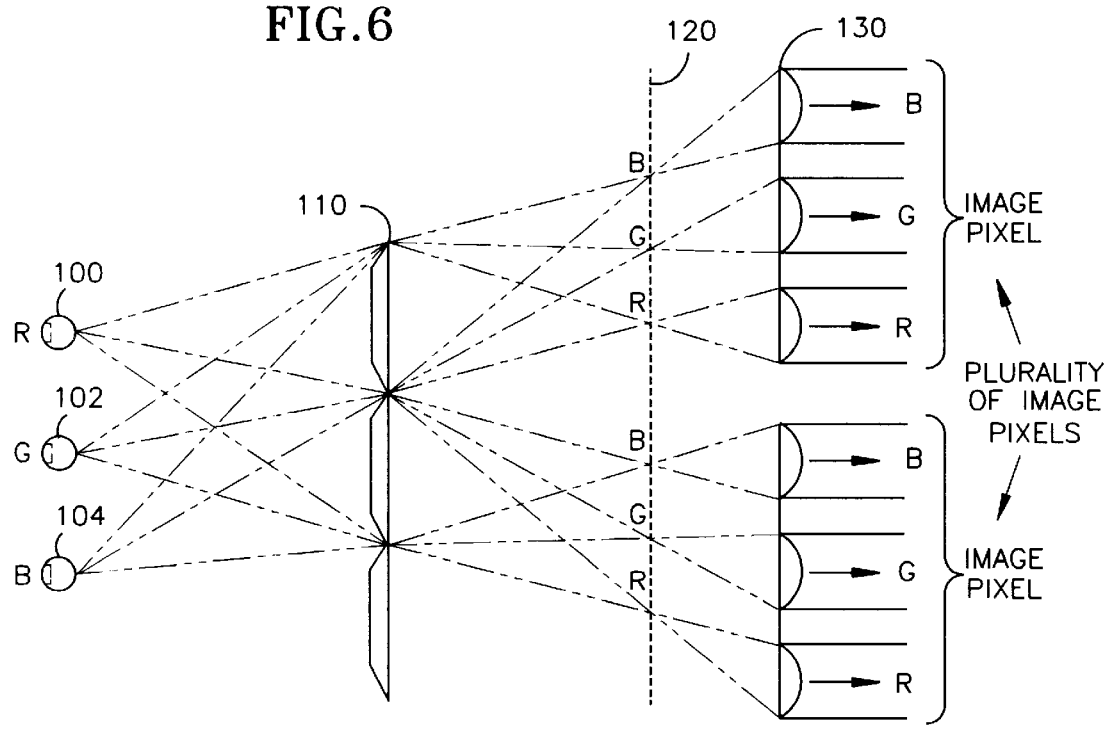
FIG. 6 illustrates a cross-sectional perspective of a fourth embodiment of the present invention.

Referring to FIG. 6, a cross-sectional perspective of a fourth embodiment is shown. The chromatic liquid crystal display system of this embodiment comprises a group of optical fibers, 100, 102 and 104, which form a colorized illuminator. Each fiber of the group is designated a color— red, green and blue. This color designation may be realized by several methods, including employing a plurality of discrete scattering sites each having a fluorescent composition, as described herein. However, unlike the previous embodiment, the discrete scattering sites of a particular fiber are all of the same color. Alternately, the color designation may be realized by employing a color filter dedicated for each optical fiber of the group. A further alternative comprises a plurality of fibers for carrying only red, green, or blue light, in respective sequence.

The output of color light emissions of each fiber of a group of fibers are directed at a first lens arrangement 110. First lens arrangement 110 couples each fiber with an associated plurality of color pixels of liquid crystal display 120.

Moreover, the chromatic liquid crystal display system also comprises an additional lens arrangement 130 for recombining the red, green and blue emissions of a set of color pixels from the liquid crystal display 120 into a resultant color in an additional embodiment as detailed hereinabove. Additional lens arrangement 50 may also be realized by a MOM lenslet. Further, at least one of lens arrangements 110 and 130 may be formed on a substrate.

Figure 7:
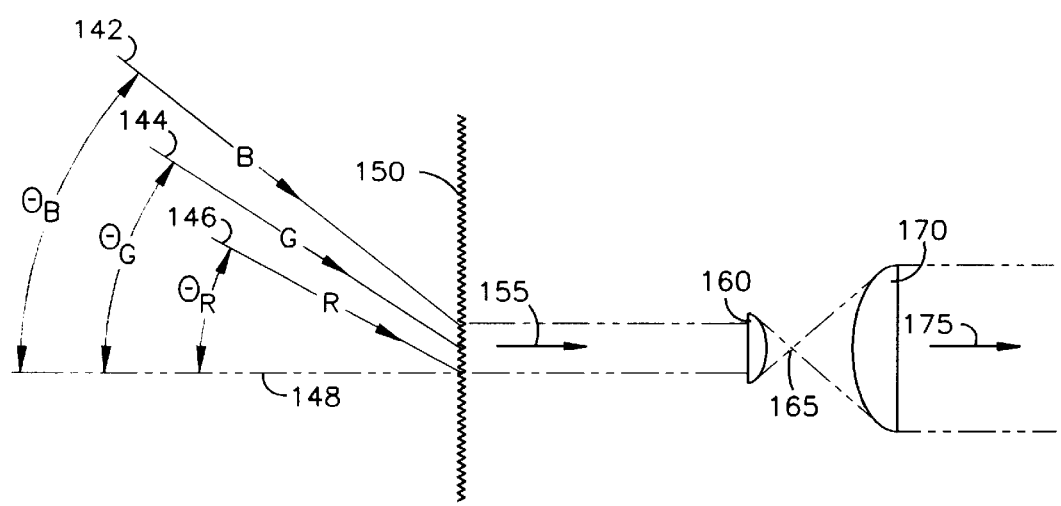
FIG. 7 illustrates a cross-sectional perspective of a fifth embodiment of the present invention.

Referring to FIG. 7, a cross-sectional perspective of a fifth embodiment of the present invention is depicted. Here, a first means is detailed for fusing the outputs of each pixel of each associated set of color pixels. By incorporating this means for fusing, a resultant luminance pixel is realized, for each set of pixels, having a desired color. Thus, the means for fusing enhances the image output of an LCD display diminished by the spacing between each pixel. It should be apparent to one of ordinary skill that this embodiment may be applied in conjunction with any of the previous embodiments teaching a chromatic liquid crystal display system.

The means for fusing comprises a transmission grating 150 for filtering the pixel outputs (blue) 142, (green) 144 and (red) 146 of an LCD display (not shown). Each pixel output 142, 144 and 146, respectively, makes an angle $\theta_B$, $\theta_G$ and $\theta_R$ with an axis 148. The small optical source size achievable with this illuminator allows such angles to be well defined.

Further, transmission grating 150 generates an output 155 directed at a first lenslet array 160. First lenslet array 160 spatially converges output 155 and transmits an output 165 in the direction of a second lenslet array 170. Second lenslet array 170 magnifies output 165 and generates an output 175 such that the voids between each pixel of the LCD appear substantially filled.

Figure 8A:
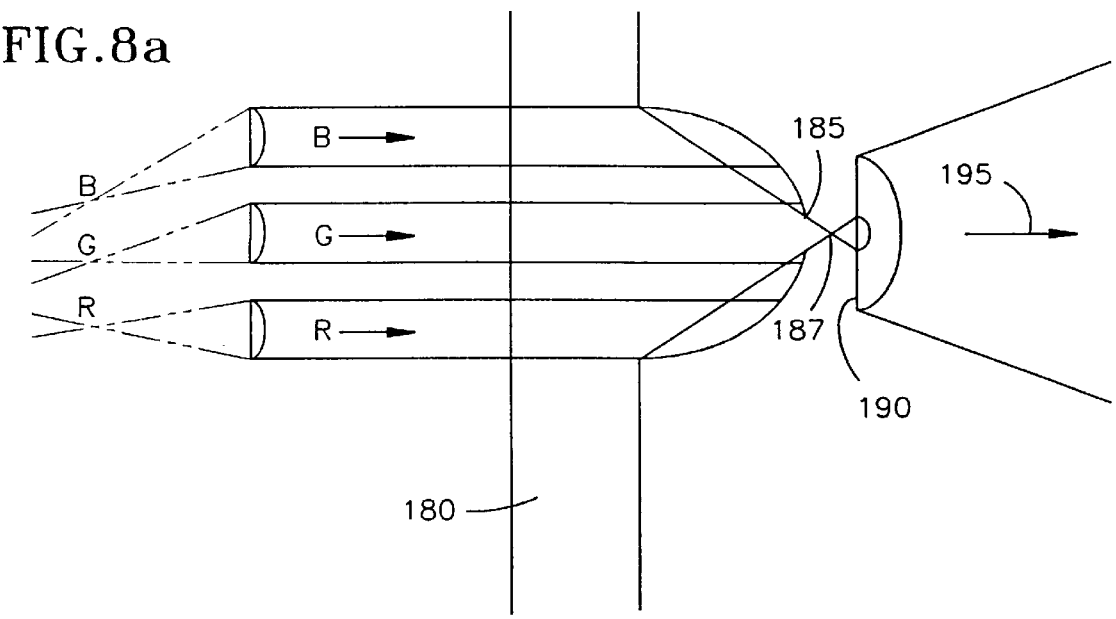
FIGS. 8a and 8b illustrate a cross-sectional and three dimensional perspective of a sixth embodiment of the present invention.
Figure 8B:
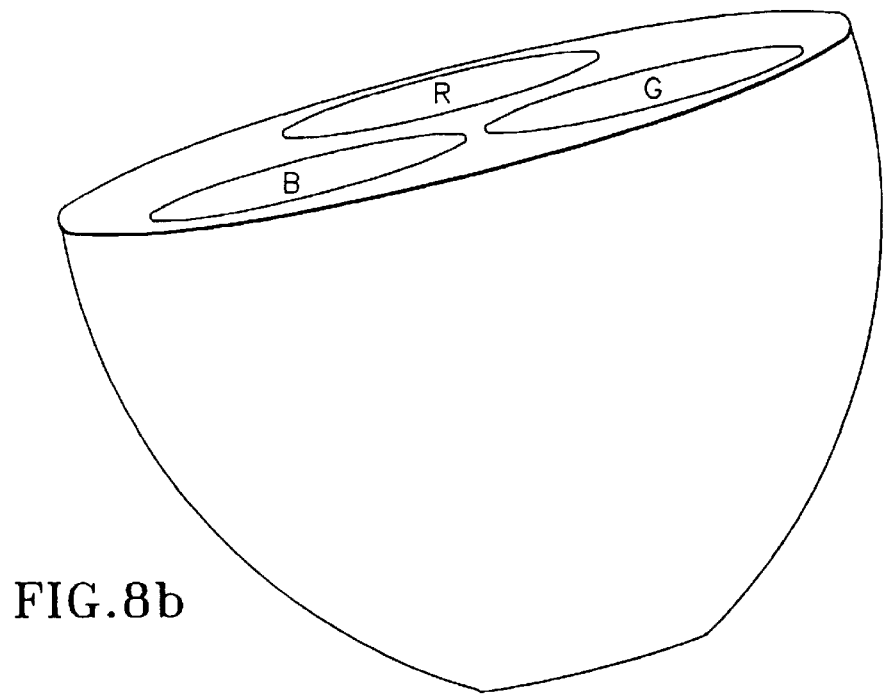

Referring to FIGS. 8a and 8b, a cross-sectional and three-dimensional perspective of a sixth embodiment of the present invention are shown. Here, a second realization of the means for fusing the outputs of each pixel of each associated set of color pixels is depicted.

The means for fusing the outputs of each pixel in this embodiment comprises a non-imaging concentrator 180 for converging the outputs of a set of pixels to an exit aperture 185 such that these outputs are substantially mixed. Further, non-imaging concentrator 180 comprises a bi-parabolic shape and an aluminizer surface, as best viewed, in FIG. 8b. Although this bi-parabolic shape is preferred, it should be apparent to one of ordinary skill in the art that other shapes will also be effective. The exit aperture 185 of the non-imaging concentrator 180 is directed at a lenslet array 190. Lenslet array 190 functionally magnifies aperture 185 and generates an output 195 such that the voids between each pixel of the LCD appear substantially filled.

The current illuminator design has a number of advantages over the known art. First, the effective size of the source region is substantially smaller than the size of the active LCD sites. This is in contrast to Lambertian sources where the effective size of the source region is always greater than the active LCD site size. As such, all the light collected by a lens can be directed through the LCD's active site giving the current invention the potential for significantly higher illumination efficiency than previously known.

In that same light, because the effective source size is substantially small, optical arrangements can be effectively employed in conjunction with the LCD's output. Typically, these additional optical arrangements are only beneficial for nearly collimated beams. However, by supplementing the illuminator of the present invention with optical arrangements because of the small source size, pixel fusion can be uniquely realized. This is in contrast to the other known approaches, including the teachings of U.S. Pat. Nos. 5,012,274 and 5,300,942, which are limited because they implicitly assume a nearly Lambertian illumination source.

Moreover, the present invention enables the separation of the light generation source from the illumination. By separating the source from the illumination, heat generating light sources may be separated from the display areas. This facilitates the realization of a flat panel display, and may create a red, green and blue illumination area for creating a color display, without encountering the losses traditionally arising by the use of red, green and blue filters at each LCD active site.

While the particular invention has been described with reference to illustrative embodiments, this description is not meant to be construed in a limiting sense. It is understood that although the present invention has been described in a preferred embodiment, various modifications of the illustrative embodiments, as well as additional embodiments of the invention, will be apparent to persons skilled in the art upon reference to this description without departing from the spirit of the invention, as recited in the claims appended hereto. It is therefore contemplated that the appended claims will cover any such modifications or embodiments as fall within the true scope of the invention.

All of the U.S. patents cited herein are hereby incorporated by reference as if set forth in their entirety.

What is claimed is:

1. A chromatic liquid crystal display system comprising:
    a liquid crystal display having a plurality of pixel sets, each of said plurality of pixel sets comprising a plurality of pixels;
    a colorized illuminator for illuminating each of said plurality of pixel sets with a colorized light beam, said colorized illuminator comprising:
    an optical fiber for transmitting a light beam within said optical fiber, said optical fiber having discrete scattering sites positioned along the length of said optical fiber for scattering a portion of said light beam outside said optical fiber, wherein said discrete scattering sites are arranged in groups of discrete scattering sites, each of said groups comprising a red, green and a blue discrete scattering site; and
    a first lens arrangement for optically coupling each of said discrete scattering sites with at least one corresponding pixel from said plurality of pixels from more than one of said plurality of pixel sets.

2. The system of claim 1, further comprising a second lens arrangement for recombining emissions from more than one of said corresponding pixels into a resultant color.

3. The system of claim 2, wherein said first lens arrangement and said second lens arrangement comprises a micro-optic multiplet lenslet.

4. The system of claim 3, wherein said first lens arrangement and said second lens arrangement is formed on a substrate.

5. The system of claim 1, wherein at least one of said red scattering site, green scattering site and blue scattering site comprises a fluorescent composition.

6. The system of claim 1, wherein each of said plurality of pixel sets comprise at least one red pixel having a first output, at least one green pixel having a second output and at least one blue pixel having a third output, and said system further comprises means for fusing said outputs, such that a resultant luminance pixel is realized having a desired color for each of said plurality of pixel sets.

7. The system of claim 6, wherein said means for fusing said outputs comprises:
    a first lenslet array for spatially converging each of said outputs filtered by a transmission grating; and
    a second lenslet array for magnifying said outputs, filtered by said transmission grating such that any voids between said plurality of pixels are substantially filled.

8. The system of claim 6, wherein said means for fusing said outputs comprises:
    a non-imaging concentrator for converging said outputs to an exit aperture such that said outputs are substantially mixed; and
    a first lenslet array for magnifying said outputs mixed by said non-imaging concentrator such that any voids between said plurality of pixels are substantially filled.

9. A chromatic liquid crystal display system comprising:
    a liquid crystal display having a plurality of pixel sets, each of said pixel sets comprising a plurality of pixels;
    an illuminator for illuminating each of said plurality of pixel sets, said illuminator comprising:
    a group of optical fibers, each optical fiber of said group of optical fibers transmitting a light beam within said optical fiber, each of said optical fibers of said group of optical fibers having a number of discrete scattering sites positioned along the length of said optical fibers for scattering a portion of said light beam outside each of said optical fibers, said group of optical fibers comprising a red, green and a blue fiber; and
    a first lens arrangement for optically coupling each of said number of discrete scattering sites of each of said optical fibers of said group of optical fibers with at least one corresponding pixel from more than one of said plurality of pixel sets.

10. The system of claim 9, further comprising a second lens arrangement for recombining emissions from more than one of said corresponding pixels into a resultant color.

11. The system of claim 10, wherein said first lens arrangement and said second lens arrangement comprises at least one of a micro-optic multiplet lenslet and an integrated monolithic lenslet module.

12. The system of claim 10, wherein said first lens arrangement and said second lens arrangement are formed on a substrate.

13. The system of claim 9, wherein said number of discrete scattering sites of at least one of said red, blue and green fibers comprise a fluorescent composition.

14. The system of claim 9, wherein each of said plurality of pixel sets comprise at least one red pixel having a first output, at least one green pixel having a second output and at least one blue pixel having a third output, and said system further comprises means for fusing said outputs, such that a resultant luminance pixel is realized having a desired color for each of said plurality of pixel sets.

15. The system of claim 14, wherein said means for fusing said outputs comprises:
    a first lenslet array for spatially converging each of said outputs filtered by a transmission grating; and
    a second lenslet array for magnifying said outputs filtered by said grating such that any voids between said plurality of pixels are substantially filled.

16. The system of claim 14, wherein said means for fusing said outputs comprises:

a non-imaging concentrator for converging said outputs to an exit aperture such that said outputs are substantially mixed; and a first lenslet array for magnifying said outputs mixed by said non-imaging concentrator such that any voids between said plurality of pixels are substantially filled.

* * * * *